US006994839B2

(12) United States Patent
Reichman et al.

(10) Patent No.: US 6,994,839 B2

(45) Date of Patent: Feb. 7, 2006

(54) CARBONATE RECYCLING IN A HYDROGEN PRODUCING REACTION

(75) Inventors: Benjamin Reichman, West Bloomfield, MI (US); William Mays, Commerce, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 354 days.

(21) Appl. No.: 10/636,093

(22) Filed: Aug. 7, 2003

(65) Prior Publication Data

US 2004/0028603 A1 Feb. 12, 2004

Related U.S. Application Data

(63) Continuation-in-part of application No. 09/929,940, filed on Aug. 15, 2001, now Pat. No. 6,607,707, and a continuation-in-part of application No. 10/321,935, filed on Dec. 17, 2002, now Pat. No. 6,890,419.

(51) Int. Cl.
*C01B 3/24* (2006.01)
*C01B 3/22* (2006.01)

(52) U.S. Cl. .............................. 423/648.1; 423/419.1; 423/421; 423/422; 423/427; 423/430; 423/432; 423/650

(58) Field of Classification Search ............ 423/648.1, 423/650, 419.1, 421, 422, 427, 430, 432
See application file for complete search history.

(56) References Cited

U.S. PATENT DOCUMENTS

| | | | | |
|---|---|---|---|---|
| 4,743,439 | A * | 5/1988 | Ready | 423/421 |
| 5,993,772 | A * | 11/1999 | Ninane et al. | 423/432 |
| 6,416,727 | B1 * | 7/2002 | Virtanen | 423/432 |
| 6,699,457 | B2 * | 3/2004 | Cortright et al. | 423/648.1 |
| 2001/0033820 | A1 * | 10/2001 | Yaniv | 423/432 |
| 2003/0170171 | A1 * | 9/2003 | Cortright et al. | 423/648.1 |

* cited by examiner

*Primary Examiner*—Wayne A. Langel
(74) *Attorney, Agent, or Firm*—Kevin L. Bray; Marvin S. Siskind

(57) ABSTRACT

A process for producing hydrogen gas from a reaction of an organic substance and a base with a recycling of a carbonate or bicarbonate by-product and a regeneration of the base. In one embodiment, reaction of an organic substance and a base produces hydrogen gas and a metal carbonate. The instant invention provides recycling of the metal carbonate by-product. In a preferred embodiment, the metal carbonate by-product is soluble and recycling includes a three step process. In a first step, the soluble metal carbonate is reacted with a metal hydroxide to form a weakly soluble or insoluble metal carbonate that precipitates in a metathesis reaction. The metal hydroxide reactant of the hydrogen producing reaction is also formed in the metathesis reaction and remains in solution. Precipitation of the carbonate thus permits ready isolation of the carbonate by-product, while leaving behind an aqueous metal hydroxide phase that can be returned to and further utilized in the hydrogen producing reaction. The metal carbonate precipitate of the metathesis reaction is thermally decomposed to form a metal oxide solid in a second step. In a third step, the metal oxide is reacted with water to reform the metal hydroxide reactant of the metathesis reaction. The hydrogen producing reaction and recycling process are sustainable in that the metal hydroxide reactant of each reactant is regenerated in the recycling process. In an alternative embodiment, the hydrogen producing reaction produces a metal carbonate precipitate directly and recycling occurs through thermal decomposition of the metal carbonate to form a metal oxide followed by reaction of the metal oxide with water to reform the metal hydroxide employed in the hydrogen producing reaction. In yet another embodiment, a bicarbonate by-product is formed by a hydrogen producing reaction of an organic substance and a base and bicarbonate recovery occurs by heating the bicarbonate to form a carbonate and recycling according to the instant carbonate recycling process.

24 Claims, No Drawings

CARBONATE RECYCLING IN A HYDROGEN PRODUCING REACTION

CROSS-REFERENCE TO RELATED APPLICATIONS

This application is a continuation-in-part of application Ser. No. 09/929,940, filed Aug. 15, 2001, now U.S. Pat. No. 6,607,707 the disclosure of which is herein incorporated by reference, and a continuation-in-part of application Ser. No. 10/321,935, filed Dec. 17, 2002, now U.S. Pat. No. 6,890,419 the disclosure of which is herein incorporated by reference.

FIELD OF INVENTION

This invention relates to a process for forming hydrogen gas. More particularly, this invention relates to the production of hydrogen gas from hydrocarbons and oxygenated hydrocarbons through reactions with a base or through electrochemical reaction or electrochemical reaction in the presence of a base. Most particularly, this invention relates to the recovery and reutilization of a by-product formed in the hydrogen producing reactions.

BACKGROUND OF THE INVENTION

Modern societies are critically dependent on energy to maintain their standards of living and economic viabilities. All aspects of modern life, ranging from the generation of electricity to the powering of automobiles, require the consumption of energy. Conventional fossil fuels are primarily used to meet the energy needs of today's societies. As more societies modernize and existing modern societies expand, the consumption of energy continues to increase at ever growing rates. The increased worldwide use of fossil fuels is creating a number of problems. First, fossil fuels are a finite resource and concern is growing that fossil fuels will become fully depleted in the foreseeable future. Scarcity raises the possibility that escalating costs could destabilize economies as well as the likelihood that nations will go to war over the remaining reserves. Second, fossil fuels are highly polluting. The greater combustion of fossil fuels has prompted recognition of global warming and the dangers it poses to the stability of the earth's ecosystem. In addition to greenhouse gases, the combustion of fossil fuels produces soot and other pollutants that are injurious to humans and animals. In order to prevent the increasingly deleterious effects of fossil fuels, new energy sources are needed.

The desired attributes of a new fuel or energy source include low cost, plentiful supply, renewability, safety, and environmental compatibility. Hydrogen is currently the best prospect for these desired attributes and offers the potential to greatly reduce our dependence on conventional fossil fuels. Hydrogen is the most ubiquitous element in the universe and, if realized, offers an inexhaustible fuel source to meet the increasing energy demands of the world. Hydrogen is available from a variety of sources including coal, natural gas, hydrocarbons in general, organic materials, inorganic hydrides and water. These sources are geographically well distributed around the world and accessible to most of the world's population without the need to import. In addition to being plentiful and widely available, hydrogen is also a clean fuel source. Combustion of hydrogen produces water as a by-product. Utilization of hydrogen as a fuel source thus avoids the unwanted generation of the carbon and nitrogen based greenhouse gases that are responsible for global warming as well as the unwanted production of soot and other carbon based pollutants in industrial manufacturing. Hydrogen truly is a green energy source.

The realization of hydrogen as a ubiquitous source of energy ultimately depends on its economic feasibility. Economically viable methods for producing hydrogen as well as efficient means for storing, transferring, and consuming hydrogen, are needed. Chemical and electrochemical methods have been proposed for the production of hydrogen. The most readily available chemical feedstocks for hydrogen are organic compounds, primarily hydrocarbons and oxygenated hydrocarbons. Common methods for obtaining hydrogen from hydrocarbons and oxygenated hydrocarbons are dehydrogenation reactions and oxidation reactions.

Steam reformation and the electrochemical generation of hydrogen from water through electrolysis are two common strategies currently used for producing hydrogen. Both strategies, however, suffer from drawbacks that limit their practical application and/or cost effectiveness. Steam reformation reactions are endothermic at room temperature and therefore require heating. Temperatures of a few to several hundred degrees are needed to realize acceptable reaction rates. These temperatures are costly to provide, impose special requirements on the materials used to construct the reactors, and limit the range of applications. Steam reformation reactions also occur in the gas phase, which means that hydrogen must be recovered from a mixture of gases through a separation process that adds cost and complexity to the reformation process. Steam reformation also leads to the production of the undesirable greenhouse gases $CO_2$ and/or CO as by-products. Water electrolysis has not been widely used in practice because high expenditures of electrical energy are required to effect water electrolysis. The water electrolysis reaction requires a high minimum voltage to initiate and an even higher voltage to achieve practical rates of hydrogen production. The high voltage leads to high electrical energy costs for the water electrolysis reaction and has inhibited its widespread use.

In the co-pending parent applications (U.S. patent application Ser. Nos. 09/929,940 U.S. Pat. No. 6,607,707, and Ser. No. 10/321,935, U.S. Pat. No. 6,890,419, the disclosures of which are incorporated by reference herein), the instant inventors considered the production of hydrogen from hydrocarbons and oxygenated hydrocarbons. In U.S. patent application Ser. No. 09/929,940, the instant inventors considered the production of hydrogen through reactions of hydrocarbons and oxygenated hydrocarbons with a base. Using a thermodynamic analysis, the instant inventors determined that reactions of many hydrocarbons and oxygenated hydrocarbons react spontaneously with a base or basic aqueous solution to form hydrogen gas at particular reaction conditions, while the same hydrocarbons and oxygenated hydrocarbons react non-spontaneously in conventional steam reformation processes at the same reaction conditions. Inclusion of a base was thus shown to facilitate the formation of hydrogen from many hydrocarbons and oxygenated hydrocarbons and enabled the production of hydrogen at less extreme conditions than those normally encountered in steam reformation reactions.

Representative hydrogen producing reactions disclosed in co-pending U.S. patent application Ser. No. 09/929,940 include the reactions of methanol in the presence of a base shown below:

$$CH_3OH+OH^-+H_2O \leftrightarrows 3H_2+HCO_3^-$$

$$CH_3OH+2OH^- \rightleftharpoons 3H_2+CO_3^{2-}$$

As discussed in the co-pending U.S. application Ser. No. 09/929,940, U.S. Pat. No. 6,607,707, both reactions may occur separately or simultaneously depending on the reaction conditions. The inventors showed that hydrogen was produced from a liquid phase mixture of methanol and a base and that hydrogen was the only gaseous product formed, thereby obviating the need for the gas phase separation required for conventional steam reformation processes. The required reaction temperature was less than the boiling point of the mixture and required only a modest input of energy to effect. Analogous reactions with other hydrocarbons and oxygenated hydrocarbons were also disclosed.

In co-pending U.S. patent application Ser. No. 10/321, 935, U.S. Pat. No. 6,890,419, the instant inventors considered electrochemical methods to promote the production of hydrogen from organic substances in the presence of water (e.g. acidic solution) and/or a base. They showed that electrochemical reactions of organic substances with water to produce hydrogen require lower electrochemical cell voltages than water electrolysis. They also showed that electrochemical reactions of organic substances in the presence of an acid or base require low electrochemical cell voltages at room temperature. In some embodiments, hydrogen production reactions of organic substances were shown to occur spontaneously at room temperature in an electrochemical reaction and were accelerated by heating. In other embodiments, hydrogen production reactions of organic substances were shown to occur spontaneously at room temperature without applying a voltage and were accelerated by providing a voltage.

A representative example of a hydrogen producing electrochemical reaction disclosed in co-pending U.S. application Ser. No. 10/321,935, U.S. Pat. No. 6,890,419 is a reaction of methanol with a base in the presence of an electrochemical potential. The corresponding electrochemical reactions are shown below:

$$CH_3OH_{(l)} + 7OH^-_{(aq)} \rightleftharpoons HCO_3^-{}_{(aq)} + 5H_2O_{(l)} + 6e^- \quad \text{(anode, oxidation)}$$

$$6H_2O_{(l)} + 6e^- \rightleftharpoons 3H_{2(q)} + 6OH^-_{(aq)} \quad \text{(cathode, reduction)}$$

$$CH_3OH_{(l)} + OH^-_{(aq)} + H_2O_{(l)} \rightleftharpoons HCO_3^-{}_{(aq)} + 3H_{2(g)} \quad \text{(overall)}$$

Methanol may also react with two equivalents of hydroxide ion to produce hydrogen gas according to the following electrochemical reactions:

$$CH_3OH_{(l)} + 8OH^-_{(aq)} \rightleftharpoons CO_3^{2-}{}_{(aq)} + 6H_2O_{(l)} + 6e^- \quad \text{(anode, oxidation)}$$

$$6H_2O_{(l)} + 6e^- \rightleftharpoons 3H_{2(q)} + 6OH^-_{(aq)} \quad \text{(cathode, reduction)}$$

$$CH_3OH_{(l)} + 2OH^-_{(aq)} \rightleftharpoons CO_3^{2-}{}_{(aq)} + 3H_{2(g)} \quad \text{(overall)}$$

The amount of base present in the reaction mixture influences whether methanol reacts primarily with one or two equivalents of hydroxide ion in the overall reaction. In principle, both reactions can occur simultaneously and in practice, the specific reaction conditions determine whether one overall reaction is more important than the other overall reaction. The instant inventors also showed that the electrochemical reactions of methanol with one or two equivalents of hydroxide ion occur spontaneously at room temperature and that application of an electrochemical potential increased the rate of hydrogen production from each reaction. Similarly beneficial effects were disclosed for electrochemical reactions of other organic substances.

Bases suitable for the reactions disclosed in the co-pending parent applications (U.S. patent application Ser. Nos. 09/929,940, Pat. 6,607,707, and Ser, No. 10/321,935, Pat. 6,890,419) are compounds that provide hydroxide ions. Metal hydroxides are the preferred bases. Representative metal hydroxides include alkali metal hydroxides (e.g. NaOH, KOH etc.) alkaline earth metal hydroxides (e.g. $Ca(OH)_2$, $Mg(OH)_2$, etc.), transition metal hydroxides, post-transition metal hydroxides and rare earth hydroxides. Non-metal hydroxides such as ammonium hydroxide may also be used.

Realization of the beneficial properties of reactions that produce hydrogen from organic substances and bases requires a system level consideration of the costs and overall efficiency of the reactions. In addition to energy inputs and raw materials, consideration of the disposal or utilization of by-products must be made. Many of the reactions of a base with hydrocarbons, oxygenated hydrocarbons and other organic substances discussed in the co-pending parent applications involve the formation of the carbonate ion ($CO_3^{2-}$) or bicarbonate ion ($HCO_3^-$) as a by-product. In order to enhance the efficiency and economic viability of these reactions, it is necessary to devise ways to effectively dispense with the carbonate ion and/or bicarbonate ion by-products. It is particularly desirable to dispense with by-products in such a way as to avoid the production of environmentally harmful gases and/or in such a way as to regenerate the base reactant.

SUMMARY OF THE INVENTION

The instant invention provides a process for producing hydrogen gas from reactions of organic substances with bases in which carbonate and/or bicarbonate ion is produced as a by-product. The instant process includes a carbonate ion recycle process in which the carbonate ion by-product is transformed to a base that can subsequently be further reacted with an organic substance to produce hydrogen gas. The instant process provides a way to recover and recycle a carbonate ion by-product. The recycle process includes a first step in which carbonate ion is reacted with a metal hydroxide to form a soluble metal hydroxide and a weakly soluble or insoluble carbonate salt. The soluble metal hydroxide may be returned to the hydrogen producing reaction as a reactant for further production of hydrogen. In a second step, the carbonate salt is thermally decomposed to produce a metal oxide and carbon dioxide. In a third step, the metal oxide is reacted with water to reform the metal hydroxide used in the first step. The carbonate recycle process is thus sustainable with respect to the metal hydroxide and the overall hydrogen producing process is sustainable with respect to the base. Bicarbonate by-products of hydrogen producing reactions of organic substances with bases can be similarly recycled by first converting a bicarbonate by-product to a carbonate and then recycling the carbonate.

DETAILED DESCRIPTION OF THE INVENTION

The instant invention is concerned with the recovery and re-utilization of carbonate and bicarbonate ion by-products formed in reactions of organic substances with bases to produce hydrogen gas. The hydrogen producing reactions have been previously described in the co-pending parent applications (U.S. patent application Ser. Nos. 09/929,940, U.S. Pat. No. 6,607,707, and Ser. No. 10/321,935, U.S. Pat. No. 6,890,419; the disclosures of which are herein incorporated by reference). The hydrogen producing reactions generally involve the reaction of an organic substance with a base to produce hydrogen gas along with bicarbonate and/or carbonate ion as a by-product. Representative reactions are described in the Background section hereinabove. The reactions occur in a liquid phase in which the base is at least partially soluble. Hydrogen gas is the only gas formed in the reaction and is recovered as it evolves from the liquid. The liquid phase may also include water and the base may be added in the form of an aqueous solution. The hydrogen producing reaction may be chemical or electrochemical in nature.

The instant invention provides processes for recycling carbonate and bicarbonate ion by-products. The invention is initially illustrated in the context of carbonate ion by-products. Similar considerations apply to bicarbonate ion by-products and will be described later herein.

One embodiment of the instant invention focuses on the carbonate ion by-product that forms in many of the hydrogen producing reactions described in the co-pending parent applications. Hydrogen producing reactions that form a carbonate ion by-product may generally be written:

$$\text{organic substance+metal hydroxide} \rightarrow \text{hydrogen gas+metal carbonate} \quad (I)$$

where water may also be present as a reactant. Organic substances that react according to the hydrogen producing reaction (I) include hydrocarbons (e.g. alkanes, alkenes, alkynes and substituted forms thereof) and oxygenated hydrocarbons (e.g. alcohols, aldehydes, ketones, ethers, carboxylic acids and substituted forms thereof).

The instant invention provides a recycle process for the carbonate by-product formed in the hydrogen producing reaction (I). In one embodiment, the metal carbonate product is a soluble metal carbonate and a three-step recycle process as shown below is provided:

$$\text{metal carbonate+metal* hydroxide} \rightarrow \text{metal hydroxide+metal* carbonate} \quad (A)$$

$$\text{metal* carbonate+heat} \rightarrow \text{metal* oxide+carbon dioxide} \quad (B)$$

$$\text{metal* oxide+water} \rightarrow \text{metal* hydroxide} \quad (C)$$

where metal and metal* refer to different metals and metal* carbonate is a solid. In another embodiment, the metal carbonate product of the hydrogen producing reaction (I) is a solid and a two-step recycle process according to reactions (B) and (C) above is provided. Further description and examples of specific embodiments of the instant recycle process are provided hereinbelow.

The recycle process of the instant is conveniently discussed in the context of a representative hydrogen producing reaction (I) as shown above. As an example, the reaction of methanol ($CH_3OH$) with sodium hydroxide (NaOH) in an aqueous medium may be considered. Methanol and sodium hydroxide react to produce hydrogen gas according to the following reaction labeled (II):

$$CH_3OH_{(l)}+2NaOH_{(aq)} \rightarrow 3H_{2(g)}+Na_2CO_{3(aq)} \quad (II)$$

The by-product in this reaction, sodium carbonate ($Na_2CO_3$), is a soluble carbonate salt that remains in solution upon liberation of hydrogen gas. In solution, sodium carbonate dissociates into sodium ions ($Na^+$) and carbonate ions ($CO_3^-$). Instead of discarding the sodium carbonate by-product solution as a waste product of the reaction, the instant invention seeks to reutilize the carbonate ion in a recycle process.

One embodiment of the instant carbonate recycling process is now described. In this embodiment, the sodium carbonate by-product solution is reacted in a three step recycle process summarized by the following reactions:

$$Na_2CO_{3(aq)}+Ca(OH)_{2(aq)} \leftrightarrows 2NaOH_{(aq)}+CaCO_{3(s)} \quad (1)$$

$$CaCO_{3(s)}+\text{heat} \rightarrow CaO_{(s)}+CO_{2(g)} \quad (2)$$

$$CaO_{(s)}+H_2O_{(l)} \rightarrow Ca(OH)_{2(aq)} \quad (3)$$

In the first step, a carbonate metathesis reaction step, sodium carbonate reacts with calcium hydroxide to form sodium hydroxide and calcium carbonate. The sodium hydroxide produced is soluble and remains in solution. The calcium carbonate is nearly insoluble in solution and consequently precipitates upon its formation in the reaction. The solution phase of the product of the first reaction substantially comprises aqueous sodium hydroxide. The calcium carbonate solid can be separated from the solution phase and the solution phase can subsequently be used as the base reactant in the hydrogen producing reaction (II) described hereinabove. In the second step, a metal carbonate thermal decomposition step, the solid calcium carbonate is thermally decomposed to form calcium oxide and carbon dioxide and in the third step, the calcium oxide is reacted with water to form calcium hydroxide. The calcium hydroxide formed in the third step can be subsequently utilized in further implementations of the recycle process.

The instant recycle process beneficially dispenses with the carbonate ion formed in the hydrogen producing reaction. The recycle process is sustainable in the sense that the calcium hydroxide reactant required in the first step is regenerated in the third step. Thus, the need for fresh calcium hydroxide is limited only to amounts needed to compensate for any side reactions or other inefficiencies in the recycle process. The combination of the hydrogen producing reaction and recycle process is also sustainable in the sense that the sodium hydroxide reactant required for the hydrogen producing reaction is generated in the first step of the recycle process. This can be seen by combining the hydrogen producing reaction (II) and the recycle reaction (1), (2), and (3) to obtain the following overall net reaction:

$$CH_3OH_{(l)}+H_2O_{(l)}\rightarrow 3H_{2(g)}+CO_{2(g)}$$

The net reaction is simply a reaction of methanol with water to form hydrogen gas and carbon dioxide. The net reaction corresponds closely to the reaction utilized in conventional steam reformation, but differs in that high temperatures and thus gaseous methanol and water (steam) reactants are not necessary in the instant process. Instead, through chemical or electrochemical reaction with a base and recycling of carbonate by-product it becomes possible with the instant invention to achieve the production of hydrogen from organic substances at milder conditions without the co-generation of carbon monoxide.

The foregoing example is representative of carbonate recycling according to the instant invention. Specific considerations pertinent to different embodiments are governed by the solubilities of some of the compounds participating in the reactions. Of greatest concern are the solubility of the metal hydroxide base reactant used in the hydrogen producing reaction (I), the solubility of the metal carbonate product formed in the hydrogen producing reaction (I), and the solubility of the metal carbonate product formed in the metathesis step of the recycle process. In a preferred embodiment, the hydrogen producing reaction (I) employs a soluble metal hydroxide. This embodiment is preferred because a soluble metal hydroxide base in the hydrogen producing reaction (I) facilitates hydrogen reaction and provides faster rates of hydrogen production. The solubility of a metal hydroxide compound can be determined by considering the solubility product constant ($K_{sp}$) of the compound. Metal hydroxides with high solubility product constants are more soluble than metal hydroxides with low solubility product constants. The more soluble metal hydroxides include hydroxides of the alkali metals, $Ca^{2+}$, $Sr^{2+}$, $Ba^{2+}$ and $NH_4^+$. The foregoing example employs sodium hydroxide as the base reactant in the hydrogen producing reaction (II).

The metal carbonate formed in the hydrogen producing reaction (I) is the carbonate of the metal cation present in the metal hydroxide base of the hydrogen producing reaction. The solubility of the metal carbonate product is thus dictated by the metal hydroxide base selected for the hydrogen producing reaction. The solubility of the carbonate of a metal frequently, but not always, mirrors the solubility of the hydroxide of the metal. Typically, carbonates of metals whose hydroxides are soluble are also soluble. Exceptions, however, do exist. The solubility of particular metal carbonate can be determined by considering its solubility product constant ($K_{sp}$). The more soluble metal carbonates include carbonates of the alkali metals and $NH_4^+$. In the foregoing example, sodium hydroxide was employed as the base reactant in the hydrogen producing reaction (II) and led to the formation of sodium carbonate where both sodium hydroxide and sodium carbonate are soluble. Use of, for example, calcium hydroxide as the base reactant in the hydrogen producing reaction leads to the formation of calcium carbonate, a relatively insoluble compound, and is considered in an alternative embodiment hereinbelow.

In the instant recycle process, it is preferable for the metal carbonate formed in the hydrogen producing reaction (I) to be soluble. This preference arises because the metal carbonate formed in the hydrogen producing reaction (I) becomes a reactant in the metathesis step of the recycle process and follows from the fact that the metathesis reaction occurs more efficiently with a soluble metal carbonate reactant. A related rationale for the preference follows from the desire to achieve sustainability with respect to the metal hydroxide in the hydrogen producing reaction. As indicated above, it is preferable for the metal hydroxide reactant in the hydrogen producing reaction to be soluble. This implies a preference that the metal hydroxide product of the carbonate metathesis reaction of the recycle process be soluble, since this metal hydroxide is ultimately reutilized in the hydrogen producing reaction. A soluble metal carbonate reactant in the metathesis reaction facilitates the objective of obtaining a soluble metal hydroxide product since, in virtually all cases, metal ions having soluble carbonates also have soluble hydroxides.

The solubility of the metal hydroxide product of the metathesis reaction of the recycle process influences the preferred degree of solubility of the metal carbonate formed in the metathesis reaction and accordingly, influences the selection of metal hydroxide reactant employed in the metathesis reaction. In order to expedite separation of the products of the metathesis step, it is preferable that the metal carbonate product and the metal hydroxide product have contrasting solubilities so that one of the products is substantially in one phase (e.g. a liquid phase) and the other of the products is in a second phase (e.g. solid or precipitate phase). A solubility contrast simplifies separation of one product from the other. In light of the preference discussed hereinabove that the metal hydroxide product of the metathesis reaction be soluble, this consideration leads to a preference that the metal carbonate product of the metathesis reaction be insoluble or only weakly soluble. The solubility contrast (soluble vs. insoluble or weakly soluble) facilitates separation of the metal hydroxide product (which may be returned to the hydrogen producing reaction for further reaction) and the metal carbonate product (which contains the carbonate ion by-product of the hydrogen producing reaction and which is subsequently reacted in decomposition and hydrolysis reactions of the recycle process).

The solubility of the metal carbonate product formed in the metathesis reaction can be influenced by the selection of metal hydroxide reactant employed in the metathesis reaction. More specifically, the metal cation of the metal hydroxide reactant combines with the carbonate ion of the metal carbonate reactant (which is the metal carbonate product of the hydrogen producing reaction) to form the metal carbonate product of the metathesis reaction. Choice of the metal cation of the metal hydroxide reactant thus becomes a degree of freedom in controlling whether the metal carbonate product of the metathesis reaction precipitates. Precipitation is promoted through the use of a metal hydroxide reactant whose metal cation has a low carbonate $K_{sp}$ value. The $K_{sp}$ values of several weakly soluble or insoluble metal carbonates are included in Table 1 below:

TABLE 1

Solubility Product Constant ($K_{sp}$) Values of Representative Metal Carbonates at 25° C.

| Compound | $K_{sp}$ |
|---|---|
| $CaCO_3$ | $3.3 \times 10^{-9}$ |
| $BaCO_3$ | $2.0 \times 10^{-9}$ |
| $CdCO_3$ | $1.8 \times 10^{-14}$ |
| $CoCO_3$ | $1.0 \times 10^{-10}$ |
| $CuCO_3$ | $3 \times 10^{-12}$ |
| $PbCO_3$ | $7.4 \times 10^{-14}$ |
| $MgCO_3$ | $3.5 \times 10^{-8}$ |
| $NiCO_3$ | $1.3 \times 10^{-7}$ |
| $SrCO_3$ | $5.4 \times 10^{-10}$ |
| $ZnCO_3$ | $1.0 \times 10^{-10}$ |
| $FeCO_3$ | $3.5 \times 10^{-11}$ |

Use of a metal hydroxide reactant that includes a cation from represented in the carbonates of Table 1, promotes the formation of a carbonate precipitate in the metathesis reaction. In the foregoing example, calcium hydroxide was used as the metal hydroxide reactant in the metathesis reaction. The cation of calcium hydroxide combined with the carbonate ion of the (soluble) sodium hydroxide to form weakly soluble calcium carbonate ($K_{sp}$=3.3×$10^{-9}$) in the metathesis reaction. The selection of calcium hydroxide as a reactant thus permitted the formation of a weakly soluble metal carbonate in the metathesis reaction. Through consideration of $K_{sp}$, other suitable metal hydroxide reactants may be similarly identified to promote the formation of weakly soluble or insoluble metal carbonate products. Use of barium hydroxide ($Ba(OH)_2$), for example, as the metal hydroxide reactant in the metathesis reaction leads to formation of weakly soluble and hence readily precipitatable $BaCO_3$. Preferably, the $K_{sp}$ value of the metal carbonate product is less than $10^{-6}$.

A secondary consideration in the selection of the metal hydroxide reactant of the metathesis reaction is its solubility. As indicated hereinabove, the metal hydroxide reactant of the metathesis reaction reacts with the metal carbonate product of the hydrogen producing reaction where the metal carbonate product is preferably soluble and provided in the form of an aqueous solution as a reactant for the metathesis reaction. In this preferred embodiment, it is preferable for the metal hydroxide reactant of the metathesis reaction to be at least partially soluble in the metal carbonate reactant solution so that the reaction proceeds at a reasonable rate. High solubility of the metal hydroxide reactant is not needed, however, because precipitation of the carbonate product shifts the metathesis reaction equilibrium toward the product side and helps to drive the reaction even if the metal hydroxide reactant is only weakly soluble. Consequently, subject to the preference described hereinabove of obtaining a weakly soluble or insoluble carbonate product in the metathesis reaction, selection of the metal hydroxide reactant in the metathesis reaction should include consideration of its solubility. As indicated hereinabove, hydroxides of the alkali metals, $Ca^{2+}$, $Sr^{2+}$, and $Ba^{2+}$ are among the most soluble. Hydroxides of the alkali metals, while preferred as reactants in the hydrogen producing reaction, are less preferred as reactants in the metathesis reaction since they produce carbonates that are soluble. $Ca^{2+}$, $Sr^{2+}$, and $Ba^{2+}$, in contrast, provide weakly soluble carbonates and have hydroxides that are sufficiently soluble to promote the metathesis reaction. Consequently, hydroxides of $Ca^{2+}$, $Sr^{2+}$, and $Ba^{2+}$ are the preferred metal hydroxide reactants in the metathesis reaction.

A preferred embodiment of the instant invention thus includes a soluble metal hydroxide reactant that leads to the formation of a soluble metal carbonate in the hydrogen producing reaction and a metal hydroxide reactant in the metathesis reaction whose carbonate compound is weakly soluble or insoluble. Alkali metal hydroxides are the preferred reactants in the hydrogen producing reaction since they form highly soluble carbonates, while the hydroxides of $Ca^{2+}$, $Sr^{2+}$, and $Ba^{2+}$ are the preferred metal hydroxide reactants in the metathesis reaction. In an example of a preferred embodiment, the following general metathesis reaction may be written:

$$M_2CO_{3(aq)}+M'(OH)_{2(aq)}\rightarrow 2MOH_{(aq)}+M'CO_{3(s)}$$

where M is an alkali metal and M' is $Ca^{2+}$, $Sr^{2+}$, or $Ba^{2+}$. The metal hydroxide product MOH is soluble and is produced in the form of an aqueous MOH solution and the metal carbonate product $M'CO_3$ is formed as a precipitate.

The precipitated metal carbonate product of the metathesis reaction is decomposed in a thermal decomposition step (e.g. step 2 in the foregoing example) to form a metal oxide and carbon dioxide gas. Carbonate thermal decomposition is a well-known reaction and essentially all metal carbonates undergo decomposition. Thermal decomposition of metal carbonates can be depicted generally by the following reaction:

$$MCO_{3(s)}+\text{heat}\rightarrow MO_{(s)}+CO_{2(g)}$$

The above reaction is written for a divalent metal ($M^{2+}$). Analogous reactions can be written for carbonates of metals that are monovalent, trivalent etc.

The metal oxide formed in the decomposition step is subsequently reacted with water to form a hydroxide (e.g. step 3 in the foregoing example). The general reaction for this step can be written:

$$MO_{(s)}+H_2O_{(l)}\rightarrow M(OH)_{2(aq)}$$

The above reaction is written for a divalent metal ($M^{2+}$). Analogous reactions can be written for carbonates of metals that are monovalent, trivalent etc.

In an alternative embodiment of the instant invention, the hydrogen producing reaction (I) provides a solid metal carbonate as a product. This situation occurs when the metal carbonate product of the hydrogen producing reaction (I) is insoluble or weakly soluble and is present when the carbonate of the metal cation employed in the metal hydroxide base reactant of the hydrogen producing reaction (I) is weakly soluble or insoluble. When a solid carbonate is formed in the hydrogen producing reaction (I), it may be recycled by thermal decomposition to form a metal oxide and carbon dioxide followed by reaction of the metal oxide with water to reform the metal hydroxide initially employed in the hydrogen producing reaction.

Representative hydrogen producing reactions in accordance with this embodiment are those that include metal hydroxide reactants other than the hydroxides of the alkali metals or $NH_4^+$, since the alkali metals and $NH_4^+$ form soluble carbonates and are recycled according to the method described hereinabove. Of the remaining potential metal hydroxide reactants in the hydrogen producing reaction (I), those that are at least partially soluble are preferred in this embodiment. Representative metal hydroxide reactants that are sufficiently soluble to be effective for the hydrogen producing reaction (I) and that provide weakly soluble or insoluble metal carbonate products include the hydroxides of $Ca^{2+}$, $Sr^{2+}$, and $Ba^{2+}$.

An example according to this embodiment is a reaction of ethanol ($C_2H_5OH$) with $Sr(OH)_2$. The hydrogen producing reaction of this example is:

$$C_2H_5OH_{(l)}+2Sr(OH)_{2(aq)}+H_2O_{(l)}\rightarrow 6H_{2(g)}+2SrCO_{3(s)}$$

where the strontium carbonate product precipitates due to its low solubility product constant. The carbonate product may be recycled through thermal decomposition followed by reaction with water according to the following reactions:

$$SrCO_{3(s)}+\text{heat}\rightarrow SrO_{(s)}+CO_{2(g)}$$

$$SrO_{(s)}+H_2O_{(l)\rightarrow Sr(OH)2(aq)}$$

In this recycle process, the strontium hydroxide reactant originally employed in the hydrogen producing reaction is regenerated. Analogous reactions can be written for other organic substances and other metal hydroxides that react in a hydrogen producing reaction according to the instant invention to produce an insoluble or weakly soluble metal carbonate.

Related variations of the foregoing embodiment include embodiments in which carbonate recovery or partial carbonate recycling occur. In these embodiments, less than all of the three steps of the recycling process described hereinabove are employed. The metal carbonate formed in the hydrogen producing reaction, for example, may be directly recovered and discarded or utilized for other purposes. The metal carbonate formed in the hydrogen producing reaction may also be reacted in the metathesis reaction described hereinabove to form a different metal carbonate that is subsequently discarded or utilized for other purposes. The metal carbonate formed in the metathesis reaction may be thermally decomposed to form an oxide without further reaction of the oxide with water. Similarly, a solid metal carbonate formed in the hydrogen producing reaction may be thermally decomposed to form an oxide without further reaction with water.

As indicated hereinabove, the hydrogen producing reactions described in the co-pending parent applications may also produce a bicarbonate ion by-product. The formation of bicarbonate ion becomes favorable under conditions of lower metal hydroxide base concentration and lower pH relative to implementations of the instant hydrogen producing reactions that lead to the formation of carbonate ion as a by-product. Representative pH ranges that tend to favor the formation of carbonate vs. bicarbonate by-products have been discussed in the co-pending parent applications.

Hydrogen producing reactions that form a bicarbonate by-product may generally be written:

$$\text{organic substance+metal hydroxide+water}\rightarrow\text{hydrogen gas+metal bicarbonate} \quad \text{(III)}$$

Organic substances that react according to the hydrogen producing reaction (I) include hydrocarbons (e.g. alkanes, alkenes, alkynes and substituted forms thereof) and oxygenated hydrocarbons (e.g. alcohols, aldehydes, ketones, ethers, carboxylic acids and substituted forms thereof).

Embodiments of the instant invention provide a recycle process for the bicarbonate by-product formed in the hydrogen producing reaction (III). In one embodiment, the metal bicarbonate product of the hydrogen producing reaction (III) is converted to a metal carbonate and the metal carbonate is recycled as described in reactions (A), (B), and (C) described hereinabove. Conversion of a metal bicarbonate to a metal carbonate can be effected through heating, as indicated in the following reaction:

$$\text{metal bicarbonate+heat}\rightarrow\text{metal carbonate+water+carbon dioxide}$$

The foregoing reaction occurs for aqueous solutions of metal bicarbonates or precipitated metal bicarbonates.

As an example of bicarbonate recycling according to the instant invention, the following hydrogen producing reaction may be considered:

$$CH_3OH_{(l)}+KOH_{(aq)}+H_2O_{(l)}\rightarrow 3H_{2(g)}+KHCO_{3(aq)}$$

The bicarbonate by-product, in the form of an aqueous solution of $KHCO_3$, may be recycled by first converting it to a carbonate through the reaction:

$$2KHCO_{3(aq)}+\text{heat}\rightarrow K_2CO_{3(aq)}+H_2O_{(l)}+CO_{2(g)}$$

and then reacting the carbonate as described hereinabove through a series of reactions such as:

$$K_2CO_{3(aq)}+Ba(OH)_{2(aq)}\leftrightarrows 2KOH_{(aq)}+BaCO_{3(s)} \quad (4)$$

$$BaCO_{3(s)}+\text{heat}\rightarrow BaO_{(s)}+CO_{2(g)} \quad (5)$$

$$BaO_{(s)}+H_2O_{(l)}\rightarrow Ba(OH)_{2(aq)} \quad (6)$$

As another example of bicarbonate recycling according to the instant invention, the following reaction can be considered:

$$CH_3OH_{(l)}+Sr(OH)_{2(aq)}+2H_2O_{(l)}\rightarrow 5H_{2(g)}+Sr(HCO_3)_{2(s)}$$

where the bicarbonate product is provided in the form of a precipitate. The bicarbonate precipitate may be dispensed with through conversion to a carbonate and recycling of the carbonate as described hereinabove according to the reactions:

$$Sr(HCO_3)_{2(s)}+\text{heat}\rightarrow SrCO_{3(s)}+H_2O_{(l)}+CO_{2(g)}$$

$$SrCO_{3(s)}+\text{heat}\rightarrow SrO_{(s)}+CO_{2(g)}$$

$$SrO_{(s)}+H_2O_{(l)}\rightarrow Sr(OH)_{2(aq)}$$

The foregoing discussion and description are not meant to be limitations upon the practice of the present invention, but rather illustrative thereof. It is the following claims, including all equivalents and obvious variations thereof, in combination with the foregoing disclosure which define the scope of the invention.

We claim:

1. A process for producing hydrogen gas comprising the steps of reacting an organic substance with a first metal hydroxide in a first reaction, said first reaction producing hydrogen gas and a first metal carbonate; and reacting said first metal carbonate with a second metal hydroxide in a second reaction, said second reaction producing a second metal carbonate.

2. The process of claim 1, wherein said second metal carbonate is produced in the form of a precipitate.

3. The process of claim 2, further comprising the step of thermally decomposing said precipitated second metal carbonate, said thermal decomposition step producing a metal oxide.

4. The process of claim 3, further comprising the step of reacting said metal oxide with water.

5. The process of claim 1, wherein said organic substance is a hydrocarbon or oxygenated hydrocarbon.

6. The process of claim 1, wherein said organic substance is an alcohol.

7. The process of claim 1, wherein said organic substance is methanol.

8. The process of claim 1, wherein said organic substance is ethanol or propanol.

9. The process of claim 1, wherein said organic substance is an aldehyde.

10. The process of claim 1, wherein said first metal hydroxide is an alkali metal hydroxide.

11. The process of claim 1, wherein said first metal hydroxide is ammonium hydroxide.

12. The process of claim 1, wherein said first metal hydroxide is in the form of an aqueous solution.

13. The process of claim 1, wherein said second metal hydroxide is calcium hydroxide, strontium hydroxide or barium hydroxide.

14. The process of claim 1, wherein the solubility product constant ($K_{sp}$) of said second metal carbonate is less than $10^{-6}$.

15. The process of claim 1, wherein said second reaction further produces said first metal hydroxide.

16. A process for producing hydrogen gas comprising the steps of:

reacting an organic substance with a metal hydroxide, said reaction producing hydrogen gas and a metal carbonate, said metal carbonate forming a precipitate; and thermally decomposing said precipitated metal carbonate, said thermal decomposition step producing a metal oxide.

17. The process of claim 16, wherein said metal hydroxide is insoluble or weakly soluble.

18. The process of claim 16, wherein said metal hydroxide is calcium hydroxide, strontium hydroxide or barium hydroxide.

19. The process of claim 16, further comprising the step of reacting said metal oxide with water.

20. A process for producing hydrogen gas comprising the steps of reacting an organic substance with a first metal hydroxide in a first reaction, said first reaction producing hydrogen gas and a metal bicarbonate; and heating said metal bicarbonate, said heating step producing a first metal carbonate.

21. The process of claim 20, further comprising the step of reacting said first metal carbonate with a second metal hydroxide in a second reaction, said second reaction producing a second metal carbonate.

22. The process of claim 21, wherein said second metal carbonate is produced in the form of a precipitate.

23. The process of claim 22, further comprising the step of thermally decomposing said precipitated second metal carbonate, said thermal decomposition step producing a metal oxide.

24. The process of claim 23, further comprising the step of reacting said metal oxide with water.

* * * * *